United States Patent
Törnqvist

(10) Patent No.: US 8,549,301 B2
(45) Date of Patent: Oct. 1, 2013

(54) METHOD AND COMPUTER SYSTEM FOR ENSURING AUTHENTICITY OF AN ELECTRONIC TRANSACTION

(75) Inventor: Anders Törnqvist, Göteborg (SE)

(73) Assignee: Comfact AB, Gothenburg (SE)

( * ) Notice: Subject to any disclaimer, the term of this patent is extended or adjusted under 35 U.S.C. 154(b) by 713 days.

(21) Appl. No.: 12/309,975

(22) PCT Filed: Jul. 9, 2007

(86) PCT No.: PCT/SE2007/000672
§ 371 (c)(1),
(2), (4) Date: May 14, 2009

(87) PCT Pub. No.: WO2008/033065
PCT Pub. Date: Mar. 20, 2008

(65) Prior Publication Data
US 2009/0319797 A1    Dec. 24, 2009

(30) Foreign Application Priority Data

Sep. 15, 2006  (SE) .................................. 0601905-3

(51) Int. Cl.
*G06F 21/00*       (2013.01)
(52) U.S. Cl.
USPC ........ 713/176; 726/4; 726/5; 726/6; 713/167; 713/168; 380/280; 709/224; 705/67
(58) Field of Classification Search
USPC ........................................ 713/167, 168, 176
See application file for complete search history.

(56) References Cited

U.S. PATENT DOCUMENTS

| | | | |
|---|---|---|---|
| 6,049,786 A * | 4/2000 | Smorodinsky | 705/40 |
| 6,826,686 B1 * | 11/2004 | Peyravian et al. | 713/168 |
| 7,599,856 B2 * | 10/2009 | Agrawal et al. | 705/51 |
| 2002/0065912 A1 * | 5/2002 | Catchpole et al. | 709/224 |
| 2002/0083008 A1 * | 6/2002 | Smith et al. | 705/64 |

(Continued)

FOREIGN PATENT DOCUMENTS

| | | |
|---|---|---|
| WO | WO 9905628 | 2/1999 |
| WO | WO 9944114 | 9/1999 |
| WO | WO 0221464 | 3/2002 |

*Primary Examiner* — Morshed Mehedi
(74) *Attorney, Agent, or Firm* — Harness, Dickey & Pierce, P.L.C.

(57) ABSTRACT

At least one embodiment of the present invention relates to a method for ensuring authenticity of an electronic transaction performed during a transaction session. The method includes receiving, over a first network, a request from a user for the completion of an electronic transaction; receiving, over the first network, an authentication code from the user which has been provided to the user over a second network separated from the first network, thereby authenticating the user, completing the electronic transaction; and storing information associated with the electronic transaction and the transaction session. The method further includes generating a one-way hash value based on information comprised in the electronic transaction and information associated with the transaction session, and providing the one-way hash value to the user, wherein the one-way hash value is usable for ensuring the authenticity of the electronic transaction. The procedure enables authentication, integrity, non-repudiation, and time stamping in a cost efficient way. An enhanced security level can be achieved as the network used for providing the authentication code to the user is separate from the network where the user returns the authentication code. At least one embodiment of the present invention also relates to a corresponding computer system adapted for ensuring the authenticity of an electronic transaction.

6 Claims, 2 Drawing Sheets

(56) References Cited

U.S. PATENT DOCUMENTS

| | | | |
|---|---|---|---|
| 2003/0200439 A1* | 10/2003 | Moskowitz | 713/176 |
| 2004/0030659 A1* | 2/2004 | Gueh | 705/67 |
| 2004/0039672 A1* | 2/2004 | Zivic et al. | 705/36 |
| 2004/0143741 A1* | 7/2004 | Edwards | 713/176 |
| 2004/0151323 A1* | 8/2004 | Olkin et al. | 380/280 |
| 2004/0177281 A1* | 9/2004 | Balaz et al. | 713/202 |
| 2005/0044354 A1* | 2/2005 | Hagerman | 713/160 |
| 2005/0114666 A1* | 5/2005 | Sudia | 713/175 |
| 2006/0206709 A1* | 9/2006 | Labrou et al. | 713/167 |
| 2008/0212771 A1* | 9/2008 | Hauser | 380/44 |

* cited by examiner

METHOD AND COMPUTER SYSTEM FOR ENSURING AUTHENTICITY OF AN ELECTRONIC TRANSACTION

FIELD OF THE INVENTION

The present invention relates to a method for ensuring authenticity of an electronic transaction performed during a transaction session. The present invention also relates to a corresponding computer system adapted to ensure authenticity of an electronic transaction performed during a transaction session.

DESCRIPTION OF THE RELATED ART

Conventionally, a signature on a paper document is a way to connect a natural or legal person to a legal action such as for example an application, a report, a registration, or a sales contract. With the success of the Internet, many organizations such as municipalities, companies and banks tries to rationalize the handling of paper documents that requires a signature. In most cases this has been solved by providing documents on a web site from which it can be downloaded to be filled out and printed. The printed paper document is then signed and sent by regular mail to the receiver.

An electronic alternative that may further reduce the handling of paper documents is Public Key Infrastructure (PKI). This arrangement binds public keys with respective user identities by means of a certificate issued by a trusted third party, also known as a certificate authority (CA). Accordingly, electronic transactions can be signed in a way which provides:

authentication (i.e. make it possible to identify the source of a message), and integrity (i.e. ensures that the transaction has not been changed after it was signed).

PKI may also provide non-repudiation (i.e. prevent the act of disclaiming responsibility for a message) unless the user repudiates his signature key. To provide certainty about the date and time at which the underlying document was signed, the PKI-solution may be combined with trusted time stamping. However, a disadvantage when using a large scale PKI-solution is that it can be highly complicated and expensive for an organization.

A possible simpler solution is suggested in WO 99/44114, disclosing an arrangement for authenticating a user to an application, the application being available to the user through a first communications network, and the user is provided the possibility to be authenticated to the application by means of a mobile station communicating through a second communications network.

Another solution is suggested in WO 99/05628, disclosing an electronic bill presentment and payment system. Here, a biller computer stores complete bills for the customer. A bill presentment computer stores a summary of each complete bill along with a hash of that complete bill which is digitally signed by the biller computer. A customer computer makes a payment on a complete bill by generating a payment message which includes the hash of the selected complete bill digitally signed by the biller computer which is digitally signed by that particular customer computer. The payment message is stored in a closing record for use in resolving issues regarding whether or not the bill was changed after payment was authorized, and whether or not an alleged payment on the selected bill was authorized.

However, none of the prior art documents provides a cost efficient solution for ensuring authenticity, integrity, non-repudiation, and time stamping.

OBJECT OF THE INVENTION

There is therefore a need for an improved method for ensuring authenticity, integrity, non-repudiation, and time stamping of an electronic transaction, and more specifically that handles the costly implementations in accordance with prior art.

SUMMARY OF THE INVENTION

According to an aspect of the invention, the above object is met by a method for ensuring authenticity of an electronic transaction performed during a transaction session, comprising the steps of receiving, over a first network, a request from a user for the completion of an electronic transaction, receiving, over the first network, an authentication code from the user which has been provided to the user over a second network separated from the first network, thereby authenticating the user, completing the electronic transaction, and storing information associated with the electronic transaction and the transaction session, wherein the method further comprises the step of generating a one-way hash value based on information comprised in the electronic transaction and information associated with the transaction session, and providing the one-way hash value to the user, wherein the one-way hash value is usable for ensuring the authenticity of the electronic transaction.

The procedure enables authenticity of an electronic transaction, i.e. authentication, integrity, non-repudiation, and time stamping in a cost efficient way. Further, no prior contact between the parties is required, nor does the user need to have access to any equipment specially designed for the purpose. Other advantages associated with the procedure is that non-repudiation applies to both parties, and that both parties are provided with a verifiable proof of the authenticity of the electronic transaction. Furthermore, an enhanced security level can be achieved as the second network used for providing the authentication code to the user is separate from the first network where the user returns the authentication code. This involves active participation of the user in entering the received authentication code.

The present invention is based on the understanding that by generating a one-way hash value based on information comprised in the electronic transaction and on information associated with the transaction session, integrity, non-repudiation (for both parties), and time stamping (i.e. certainty about the date and time of the transaction) can be achieved.

Furthermore, authenticity of the user can be ensured by communicating with the user over two separate communication networks, as long as at least one of these can be tied to the identity of the user. Through the arrangement no prior contacts between the parties is required and standard equipment, such as a mobile phone and a computer having a network connection, is all that the user needs to have access to. The result is a cost efficient implementation compared to prior art arrangements.

Preferably, the first network can be a computer network and the second network can be a mobile network. This may be a convenient way to utilize standard equipment as the typical user has access to a personal computer connected to the Internet, and a mobile phone. A further advantage, in an embodiment where the authentication code is provided to the user's mobile phone, is that a verification of the user can be performed, for example, through information associated with the subscription of the mobile phone.

The authentication code, which may be a certificate and an associated one-way hash value, can advantageously be provided to the user by means of an SMS or an MMS, but can also be provided by alternative means such as, for example, a voice message or a phone call to the user. As the mobile phone and its SIM-card, or similar, typically is protected with a PIN-code only known by the user, the mobile phone can here be used as a tool for providing user authentication, thereby reducing the risk of fraud.

In an embodiment, the one-way hash value may be included with a receipt for the electronic transaction. The one-way hash value typically serves as a verifiable proof of the authenticity of the electronic transaction, and the receipt may function as a meaningful label to the user. The receipt can include the complete content of the electronic transaction, and be displayed on the user terminal, or alternatively, for example, be received by email, SMS or MMS. If the hash value is based only on information that appears on the receipt, the authenticity of the receipt can be verified without requiring any additional information as long as the hash function is known.

Furthermore, the transaction session can be signed using a digital session certificate, which connects signature verification data (such as codes or public keys) used in the transaction session with the user. Thus, the identity of the user can be confirmed and the security level of the performed transaction is further enhanced.

In a preferred embodiment, the authentication code may be a one-way hash value generated based on information associated with the initial steps of the electronic transaction. Thus, the authentication code can be tied to the electronic transaction, thereby further increasing the security level of the electronic transaction.

According to a further aspect of the invention, there is provided a computer system adapted to ensure authenticity of an electronic transaction performed during a transaction session, the computer system comprising means for receiving, over a first network, a request from a user for the completion of an electronic transaction, means for receiving, over the first network, an authentication code from the user which has been provided to the user over a second network separated from the first network, thereby authenticating the user, means for completing the electronic transaction, and means for storing information associated with the electronic transaction and the transaction session, wherein the computer system further comprises means for generating a one-way hash value based on information comprised in the electronic transaction and information associated with the transaction session, and means for providing the one-way hash value to the user, wherein the one-way hash value is usable for ensuring the authenticity of the electronic transaction. This aspect of the invention provides similar advantages as according to the above discussed.

Furthermore, the authentication code can be provided to the user by a third party communicatively connected to the computer system. This allows services to be divided between various service providers. For instance, the authentication code may be provided to the user by a mobile network operator. However, the computer system can also further comprise means for providing the authentication code over the second network.

BRIEF DESCRIPTION OF THE DRAWINGS

These and other aspects of the present invention will now be described in more detail, with reference to the appended drawings showing currently preferred embodiments of the invention, in which.

DETAILED DESCRIPTION OF CURRENTLY PREFERRED EMBODIMENTS

Figure 1:
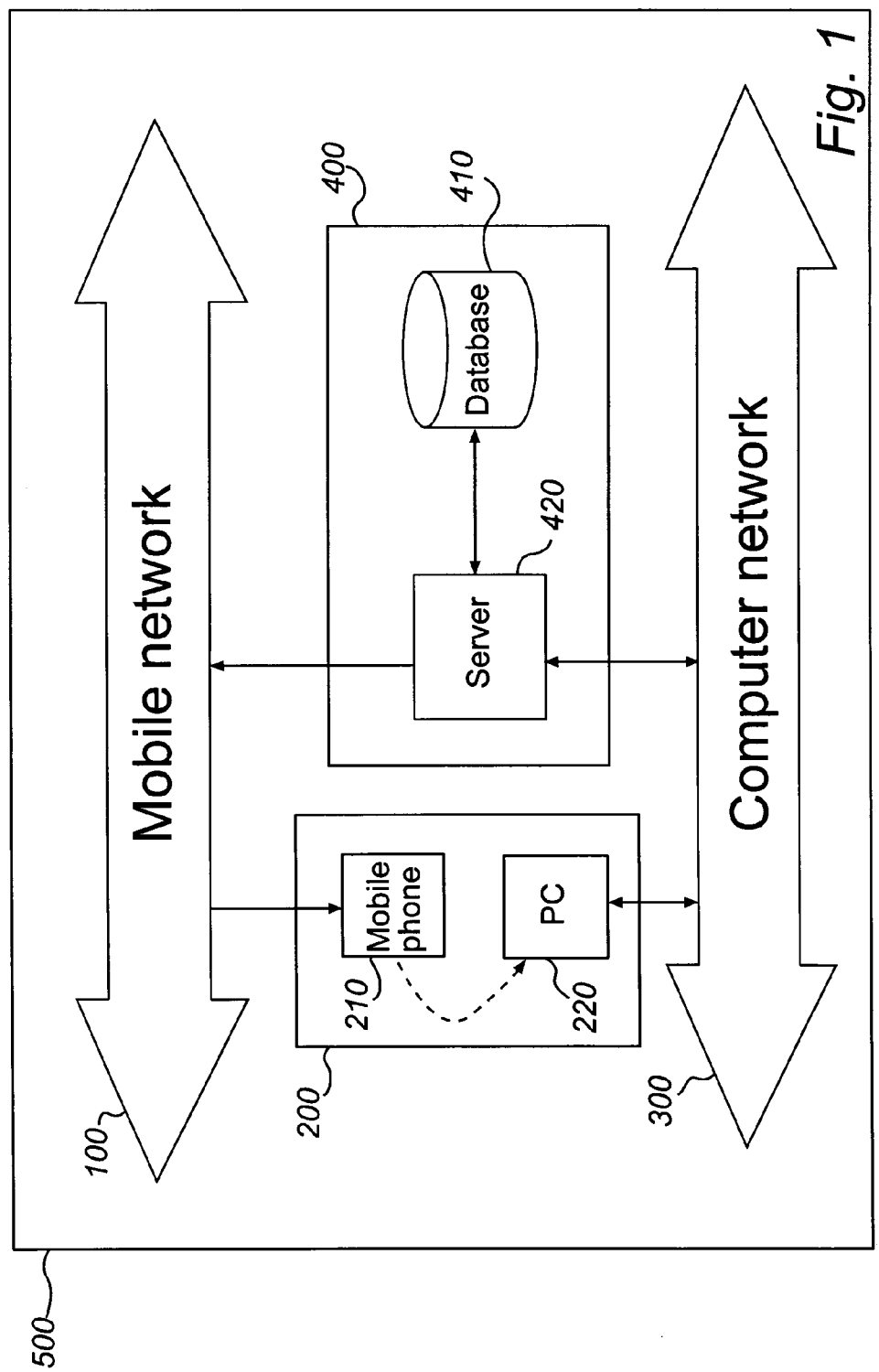
FIG. 1 is a block diagram illustrating a computer system according to an embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiment are provided for thoroughness and completeness, and fully convey the scope of the invention to the skilled addressee. Like reference characters refer to like elements throughout.

Referring now to the drawings and to FIG. 1 in particular, there is depicted the main components in an embodiment of the invention. In FIG. 1, a network environment 500 provides a platform for a user and a service provider to interact and exchange information. The user has access to an arrangement 200 comprising a user terminal 220, for example in the form of a personal computer (PC) or a work station or a portable computer, and a portable electronic device 210, such as a mobile phone comprising a SIM-card or similar. The user terminal 220 is connected to a first network 300, which is typically a computer network including for example a local area network (LAN) or a wide area network (WAN) such as the Internet, and the portable electronic device 210 is connected to a second network 100, for example in the form of a mobile network such as a GSM, a CDMA or similar mobile phone network.

The service provider administrates a computer system 400 adapted to ensure authenticity of an electronic transaction during a transaction session. The computer system 400 comprises a server 420 and a database 410. It is also provided with the possibility to connect to the computer network 300 and to the mobile network 100. Communication over the computer network 300, between the service provider and the user, can be secured as required by using a cryptographic protocol such as, for example, TLS (Transport Layer Security) or SSL (Secure Sockets Layer). Accordingly, the information can be encrypted and both parties can be authenticated. Furthermore, the server 420 may comprise, for example, a database management system utilizing SQL to access the database 410. The database 410 typically holds database records with information such as, for example, customer records and transaction records. These are preferably stored in a format such as XML.

Figure 2:
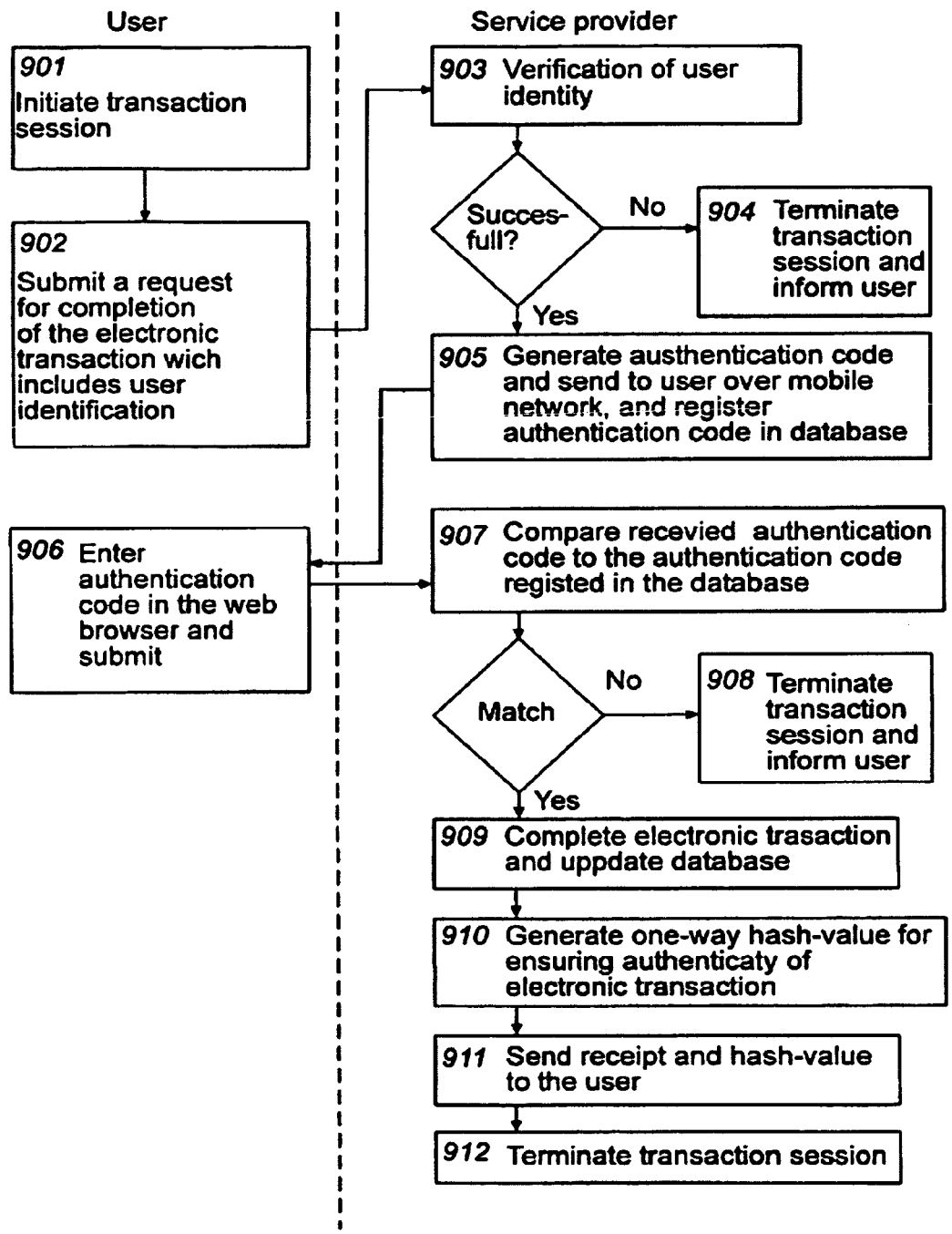
FIG. 2 is a flow chart illustrating the fundamental steps of a method according to an embodiment of the present invention for ensuring authenticity of an electronic transaction.

Turning now to FIG. 2, which is a flow chart illustrating the fundamental steps of a method according to an embodiment of the present invention, a typical procedure according to the present invention is described. In a typical application of the invention, the user may access a web site through the web browser of the user terminal 220. The web site may provide a variety of services that involves electronic transactions such as, for example, purchasing goods or electronically signing a document. As the user is about perform a electronic transaction, a transaction session is initiated, as illustrated by step 901.

In order to complete the electronic transaction, the user submits, in step 902, a request for completion of the electronic transaction. As part of this request the user is prompted to enter user identification to identify himself. Depending on the application, this may include for example name, social security number, address, credit card number, mobile phone number, and customer number with the operator of the mobile network, or similar. The request for completion of the electronic transaction is then transmitted, over the computer network 300, from the user terminal 220 to the computer system 400 of the service provider.

After receiving the request for completion of the electronic transaction, the computer system 400 of the service provider initiates, in step 903, a verification process to verify the identity of the user. This is done by comparing the user identification in the received request for completion of the electronic transaction, to the information about the user stored in the database records in the database 410. As part of the verification process, the computer system 400 may also access and utilize external information. An example of this would be information registered in a subscription record of the user's mobile phone provided from a mobile network operator. Moreover, other information related to the transaction session may be used in the verification process, such as signature verification data associated with a digital session certificates for the transaction session.

If the user identification submitted by the user cannot be confirmed by the information in the database 410, or external information, the user is not allowed to complete the electronic transaction. Thus, in step 904, the transaction session is terminated and the user is informed thereof. The information can be conveyed to the user by displaying a message on the user terminal 220, or, alternatively, an SMS or MMS could be sent to the user's mobile phone 210.

If the user identification submitted by the user is confirmed, the user is considered to be authorized to complete the electronic transaction. Thus, in step 905, an authentication code is generated and sent to the user's mobile phone 210 over the mobile network 100, for instance, as an SMS or MMS. In addition to this, the authentication code is registered in the database records in the database 410. The authentication code may advantageously be a temporary and time limited digital session certificate. Typically, such a certificate is only valid for the ongoing transaction session and for the ongoing electronic transaction and for a limited time period, such as for example a 5 minute time period. In the case where the service provider is a Certificate Authority (CA), it can issue qualified certificates.

After receiving the authentication code, the user enters, in step 906, the authentication code in the web browser of the user terminal 220. The authentication code is then transmitted to the service provider over the computer network 300.

As the computer system 400 of the service provider receives the authentication code, in step 907, it is compared to the authentication code that was registered in the database records in the above described step 905. If the received authentication code does not match the one stored in the database records, the user is not authorized to complete the electronic transaction. Hence, in step 908, the transaction session is terminated and the user is notified thereof over the computer network 300.

If the authentication code match the one registered in the database records, the electronic transaction is completed in step 909 and the database 410 is updated accordingly. This involves updating the database records with information about the electronic transaction such as, for example, first name, last name, amounts, codes, etc. In addition, the database records may also be updated with information associated with the transaction session, such as signature verification data, the hash value in the certificate, date, time, session identification and IP-address. Moreover, a string of characters representing the complete transaction is stored in the database records. This string of characters contains all relevant data of the electronic transaction as well as of the transaction session. This may include the total contents of the transaction, signature verification data, the hash value in the certificate, date, time, session identification and IP-address. If required, certain data can be omitted.

In step 910, a one-way hash value usable for ensuring the authenticity of the electronic transaction is generated from the string of characters of the transaction. This connects the user to the content of the transaction and the performed action. Examples of typical hash functions that may be used are MD5 or SHA-1.

In step 911, the complete content of the electronic transaction along with the one-way hash value thereof is sent to the user over the computer network 300, and displayed on the user terminal 220. The user may choose to print this as a receipt of the completed transaction, and a verification that it has been received by the service provider. The user can also chose to receive this information by email, to save it on the computer as a file, or to have the unique hash value sent to the user's mobile phone 210.

Finally, in step 912, the transaction session is completed.

The skilled addressee realizes that the present invention by no means is limited to the preferred embodiments described above. On the contrary, many modifications and variations are possible within the scope of the appended claims.

The invention claimed is:

1. A method for ensuring authenticity of an electronic transaction performed during a transaction session, the method comprising:
   receiving, over a first network, a request from a user for the completion of an electronic transaction;
   providing, over a second network, an authentication code to the user;
   receiving, over the first network, the authentication code entered by the user at a user terminal connected to the first network, thereby authenticating the user;
   completing the electronic transaction;
   storing a string of characters representing the electronic transaction and the transaction session, the string of characters including date, time, session identification, and IP address values associated with the electronic transaction;
   generating a one-way hash value from the string of characters such that a non-repudiation connection is formed between the authenticated user and the completed electronic transaction; and
   providing the one-way hash value to the user, wherein the one-way hash value is usable for ensuring the authenticity of the electronic transaction,
   wherein the one-way hash value is included with a receipt for the electronic transaction and the transaction session is signed using a digital session certificate.

2. The method according to claim 1, wherein the first network is a computer network and the second network is a mobile network.

3. The method according to claim 1, wherein the authentication code is a one-way hash value generated based on information associated with initiation of the transaction session.

4. A computer system adapted to ensure authenticity of an electronic transaction performed during a transaction session, the computer system comprising:
   means for receiving, over a first network, a request from a user for the completion of an electronic transaction;
   means for providing, over a second network, an authentication code to the user;

means for receiving, over the first network, the authentication code entered by the user at the user terminal connected to the first network, thereby authenticating the user;

means for completing the electronic transaction;

means for storing a string of characters representing the electronic transaction and the transaction session, the string of characters including date, time, session identification, and IP address values associated with the electronic transaction;

means for generating a one-way hash value from the string of characters such that a non-repudiation connection is formed between the authenticated user and the completed electronic transaction; and means for providing the one-way hash value to the user, wherein the one-way hash value is usable for ensuring the authenticity of the electronic transaction, wherein the one-way hash value is included with a receipt for the electronic transaction and the computer system further comprises means for generating a digital session certificate for digitally signing the transaction session.

5. The computer system according to claim 4, wherein the first network is a computer network and the second network is a mobile network.

6. The computer system according to claim 4, wherein the authentication code is provided to the user by a third party communicatively connected to the computer system.

* * * * *